US008688145B2

United States Patent
Lee et al.

(10) Patent No.: US 8,688,145 B2
(45) Date of Patent: Apr. 1, 2014

(54) METHOD OF TRANSMITTING COUNTING RESPONSE MESSAGE INDICATING SERVICE AREA AT USER EQUIPMENT IN WIRELESS COMMUNICATION SYSTEM AND APPARATUS THEREOF

(75) Inventors: Youngdae Lee, Anyang-si (KR);
Sunghoon Jung, Anyang-si (KR);
Seungjune Yi, Anyang-si (KR);
Sungduck Chun, Anyang-si (KR);
Sungjun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/201,801

(22) PCT Filed: Jun. 8, 2011

(86) PCT No.: PCT/KR2011/004177
§ 371 (c)(1),
(2), (4) Date: Aug. 16, 2011

(87) PCT Pub. No.: WO2011/159055
PCT Pub. Date: Dec. 22, 2011

(65) Prior Publication Data
US 2012/0009947 A1    Jan. 12, 2012

Related U.S. Application Data

(60) Provisional application No. 61/354,247, filed on Jun. 13, 2010.

(51) Int. Cl.
*H04W 4/02* (2009.01)

(52) U.S. Cl.
USPC ............... 455/456.3; 455/414.1; 370/389

(58) Field of Classification Search
USPC .................. 455/458, 414.1; 370/389
See application file for complete search history.

(56) References Cited

U.S. PATENT DOCUMENTS

| | | | |
|---|---|---|---|
| 2004/0180675 A1* | 9/2004 | Choi et al. | 455/458 |
| 2005/0096017 A1* | 5/2005 | Kim | 455/414.1 |
| 2006/0029066 A1* | 2/2006 | Jeong et al. | 370/389 |
| 2008/0014925 A1 | 1/2008 | Van Lieshout et al. | |
| 2008/0268878 A1* | 10/2008 | Wang et al. | 455/458 |
| 2010/0227569 A1* | 9/2010 | Bala et al. | 455/73 |

FOREIGN PATENT DOCUMENTS

| | | |
|---|---|---|
| KR | 10-2008-0071909 A | 8/2008 |
| KR | 10-2009-0021268 A | 3/2009 |
| KR | 10-2010-0030409 A | 3/2010 |

* cited by examiner

*Primary Examiner* — Kashif Siddiqui
(74) *Attorney, Agent, or Firm* — Birch, Stewart, Kolasch & Birch, LLP (57) ABSTRACT

A method for a user equipment to transmit a message in a wireless communication system is disclosed. The present invention includes the steps of receiving a first message containing an information on at least one service from a network and transmitting a second message indicating a specific area and a specific service to the network in response to the first message, if wishing to receive the specific service of the at least one service or being interested to receive the specific service of the at least one service. Preferably, the present invention further includes the step of receiving system information for providing information on at least one area.

8 Claims, 10 Drawing Sheets

(a) Control-plane protocol stack (b) User-plane protocol stack

METHOD OF TRANSMITTING COUNTING RESPONSE MESSAGE INDICATING SERVICE AREA AT USER EQUIPMENT IN WIRELESS COMMUNICATION SYSTEM AND APPARATUS THEREOF

This application is a National Phase of PCT/KR2011/004177 filed on Jun. 8, 2011, which claims priority under 35 USC 119(e) to U.S. Provisional Application No. 61/354,247 filed on Jun. 13, 2010, all of which are hereby expressly incorporated by reference into the present application.

TECHNICAL FIELD

The present invention relates to a wireless communication system, and more particularly, to a method of transmitting a counting response message indicating a service area from a user equipment in a wireless communication system and apparatus therefor.

BACKGROUND ART

First of all, in the following description, 3GPP LTE (3rd generation partnership projecting long term evolution) communication system is schematically explained as an example of a wireless communication system to which the present invention is applicable.

Figure 1:
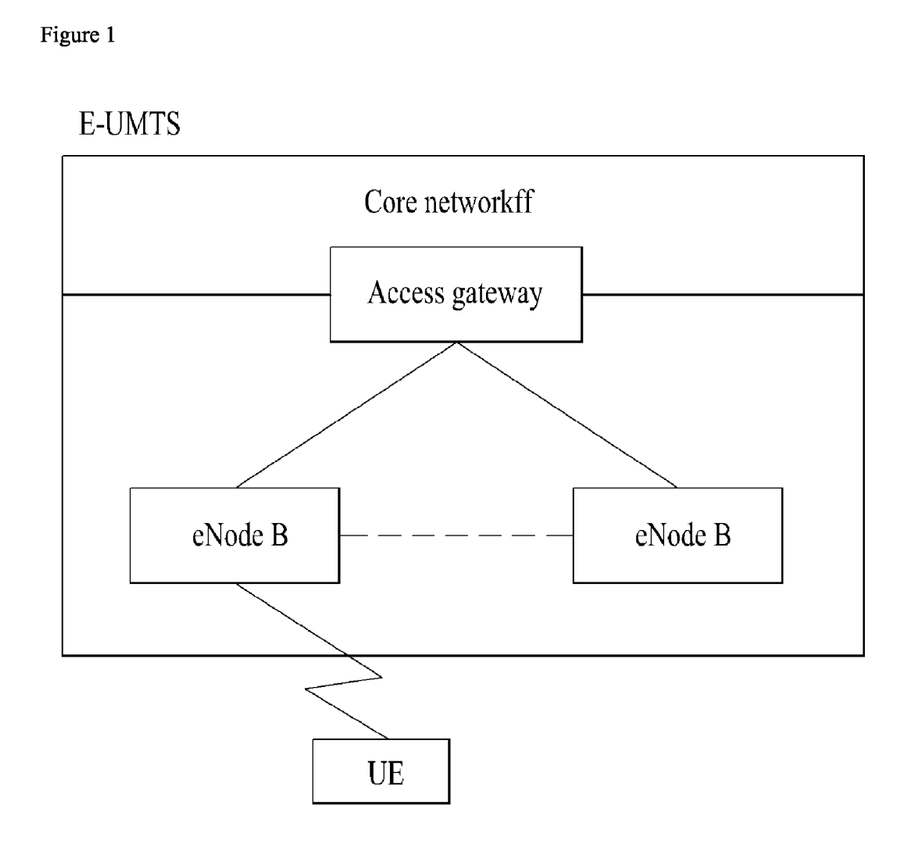
FIG. 1 is a schematic diagram of E-UMTS network structure as an example of a mobile communication system.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '3rd Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE

Technical Problem

Based on the above-mentioned discussion, a method of transmitting a counting response message indicating a service area from a user equipment in a wireless communication system and apparatus therefore shall be proposed in the following description.

Technical Solution

To achieve these and other advantages and in accordance with the purpose of the present invention, as embodied and broadly described, a method of transmitting a message, which is transmitted by a user equipment in a wireless communication system, according to one embodiment of the present invention includes the steps of receiving a first message containing an information on at least one service from a network and transmitting a second message indicating a specific area and a specific service to the network in response to the first message, if wishing to receive the specific service of the at least one service or being interested to receive the specific service of the at least one service. In this case, the method can further include the step of receiving the specific service in the specific area from the network.

Preferably, the method further includes the step of receiving system information for providing information on at least one area. More preferably, the method is able to further include the step of identifying the specific area related to the specific service based on the information on the at least one area. In this case, the specific area corresponds to an area, in which the first message is received, among the at least one area.

And, the specific area includes at least one cell for providing the specific service.

In particular, the first message includes an MBMS (multimedia broadcast multicast service) counting request message and the second message includes an MBMS counting response message. Moreover, the information on the at least one area means an MBSFN (MBMS single frequency network) area information list.

Moreover, the second message contains an index of the specific area in the information on the at least one area and an index of the specific service corresponding to the specific area.

To further achieve these and other advantages and in accordance with the purpose of the present invention, as embodied and broadly described, a user equipment in a wireless communication system according to another embodiment of the present invention includes a wireless communication module configured to transceive signals with a network and a processor controlling the wireless communication module, the processor configured to process the signals, wherein the wireless communication module receives a first message containing an information on at least one service from a network and wherein the processor generates a second message indicating a specific area and a specific service to transmit the second message to the network in response to the first message, if wishing to receive the specific service of the at least one service or being interested to receive the specific service of the at least one service.

Preferably, the wireless communication module receives system information for providing information on at least one area. In this case, the information on the at least one area can include an MBSFN (MBMS single frequency network) area information list.

Preferably, the wireless communication module receives a system information providing an MBSFN (MBMS single frequency network) area information list. And, the processor is able to check the specific area related to the specific service based on the MBSFN area information list. In this case, the specific area corresponds to an area, in which the MBMS counting request message is received, in the MBSFN area information list. In this case, the second message is able to contain an index of the specific area in the information on the at least one area.

In the above-described embodiments, the user equipment is in an RRC (radio resource control) connected state (RRC_CONNECTED).

Advantageous Effects

According to an embodiment of the present invention, a base station is able to provide an effective MBMS to a user equipment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

MODE FOR INVENTION

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

Figure 2:
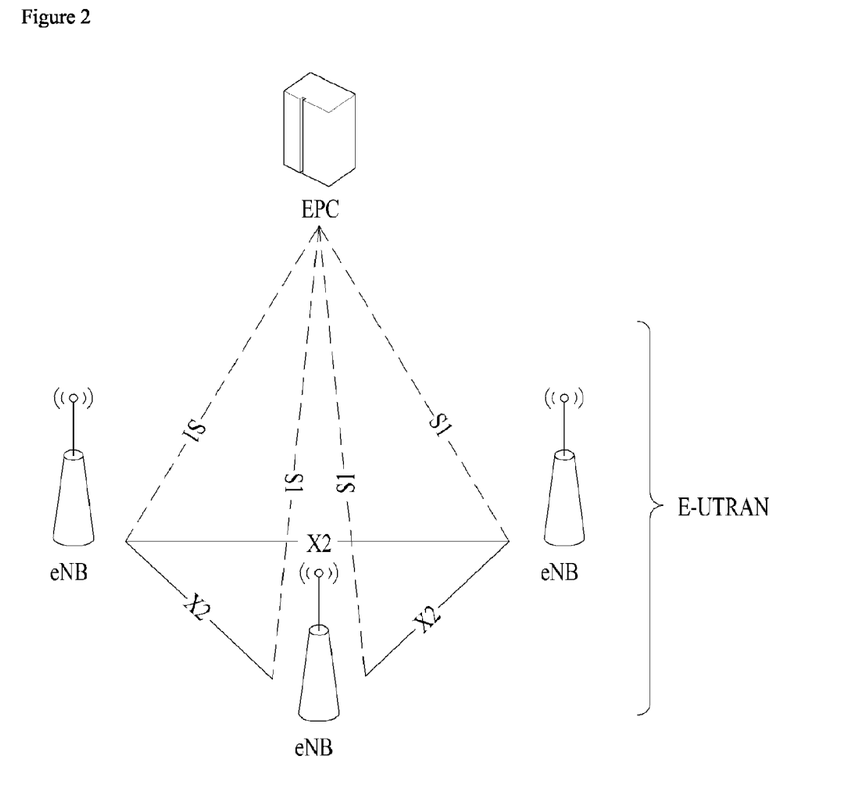
FIG. 2 is a conceptional diagram of a network structure of E-UTRAN (evolved universal terrestrial radio access network).

FIG. 2 is a conceptional diagram of a network structure of E-UTRAN (evolved universal terrestrial radio access network). In particular, the E-UTRAN system is the system evolved from a conventional UTRAN system. The E-UTRAN includes cells (e.g., eNBs). And, the cells are connected via an X2 interface with each other Each of the cell is connected to a user equipment via a radio interface and is also connected to an evolved packet core (EPC) via an S1 interface.

The EPC includes MME (Mobility Management Entity), S-GW (Serving-Gateway) and PDN-GW (Packet Data Network-Gateway). The MME has an information of a user equipment or an information on capability of the user equipment. Such information is mainly used for management of mobility of the user equipment. The S-GW is a gateway having the E-UTRAN as a terminal end point. And, the PDN-GW is a gateway having a packet data network (PDN) as a terminal end point.

Figure 3:
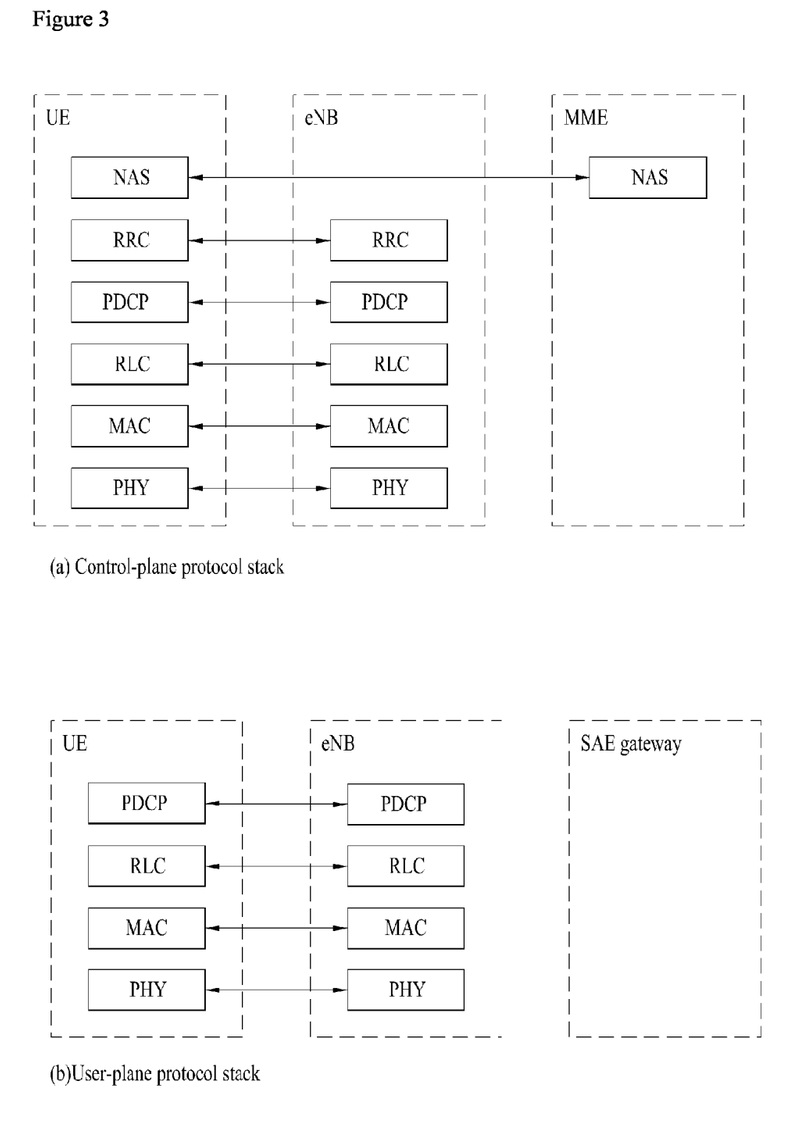
FIG. 3 is a diagram of structures of control and user planes of a radio interface protocol between a user equipment and E-UTRAN based on 3GPP radio access network specification.

FIG. 3 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH).

Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 4:
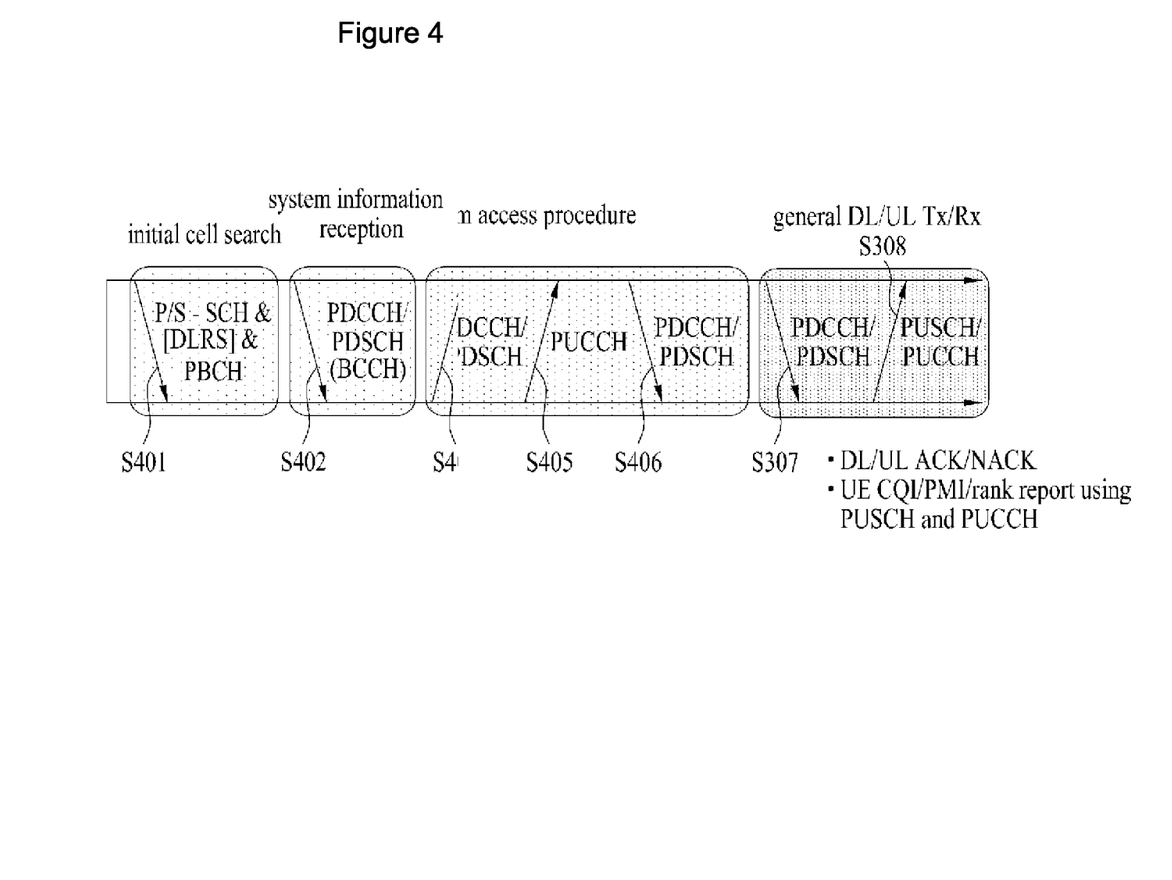
FIG. 4 is a diagram for explaining physical channels used for 3GPP system and a general method of transmitting a signal using the same.

FIG. 4 is a diagram for explaining physical channels used for 3GPP system and a general method of transmitting a signal using the same.

If a power of a user equipment is turned on or the user equipment enters a new cell, the user equipment performs an initial cell search for matching synchronization with a base station and the like [S401]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S402].

Meanwhile, if the user equipment initially accesses the base station or fails to have a radio resource for signal transmission, the user equipment is able to perform a random access procedure (RACH) on the base station [S403 to S406]. For this, the user equipment transmits a specific sequence as a preamble via a physical random access channel (PRACH) [S403] and is then able to receive a response message via PDCCH and a corresponding PDSCH in response to the preamble [S404]. In case of contention based RACH, it is able to perform a contention resolution procedure in addition.

Having performed the above mentioned procedures, the user equipment is able to perform PDCCH/PDSCH reception [S407] and PUSCH/PUCCH (physical uplink shared channel/physical uplink control channel) transmission [S408] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 5:
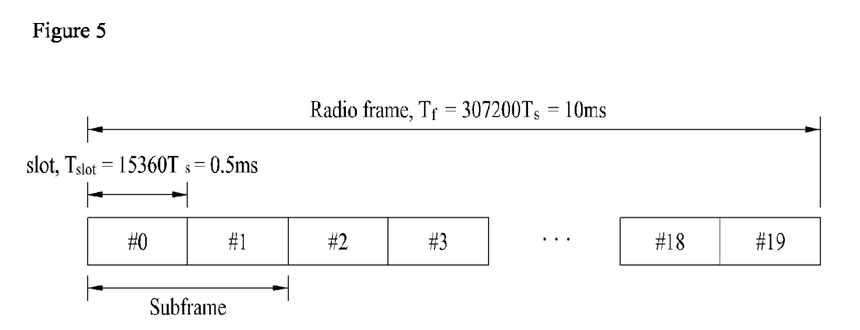
FIG. 5 is a diagram for an example of a structure of a radio frame used for LTE system.

FIG. 5 is a diagram for an example of a structure of a radio frame used for LTE system.

Referring to FIG. 5, a radio frame has a length of 10 ms (327200·Ts) and is constructed with 10 subframes in equal size. Each of the subframes has a length of 1 ms and is constructed with two slots. Each of the slots has a length of 0.5 ms (15360·Ts). In this case, Ts indicates a sampling time and is expressed as Ts=1/(15 kHz×2048)=3.2552×10-8 (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

In the following description, an RRC state of a user equipment and a corresponding RRC connecting method are explained. In this case, the RRC state means whether an RRC of a user equipment is logically connected to an RRC of E-UTRAN (i.e., logical connection). If the RRCs are connected to each other, it is called an RRC connected state (RRC_CONNECTED). If the RRCs are not connected to each other, it can be called an RRC idle state (RRC_IDLE).

Since E-UTRAN is able to obtain an existence of a user equipment in an RRC connected state by a cell unit, it is able to effectively control the user equipment. On the contrary, the E-UTRAN is unable to obtain a user equipment in an idle state by a cell unit and the corresponding user equipment is managed by a CN by a TA unit that is an area unit greater than a cell. In particular, in order to receive such a service as voice and data from a cell, a user equipment in an RRC idle state should make a transition to an RRC connected state.

Specifically, when a user initially turns on a power of a user equipment, the user equipment searches for an appropriate cell and then stays in an RRC idle state at the corresponding cell. If the user equipment staying in the RRC idle state needs to establish an RRC connection, it makes a transition to an RRC connected state by performing an RRC connection establishment process. In particular, if the RRC connection needs to be established, it means the case that an uplink data transmission is necessary due to user's call attempt or the like or the case that a response message needs to be sent in case of receiving a paging message from the E-UTRAN.

Figure 6:
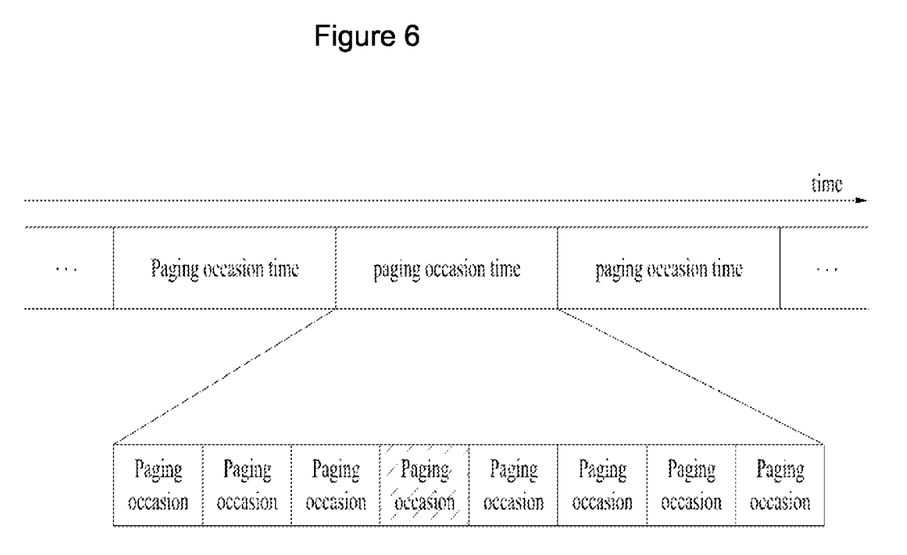
FIG. 6 is a diagram for explaining a general transceiving method using a paging message.

FIG. 6 is a diagram for explaining a general transceiving method using a paging message.

Referring to FIG. 6, a paging message contains a paging cause and a paging record including a UE identity and the like. When the paging message is received, a user equipment is able to perform a discontinuous reception (DRX) for the purpose of power consumption reduction.

In particular, a network configures several paging occasions (POs) for each time cycle called a paging DRX cycle to enable a specific user equipment to obtain a paging message by receiving a specific paging occasion only. The user equipment does not receive a paging channel in a time except the specific paging occasion and is able to stay in a sleep mode to reduce power consumption. And, one paging occasion corresponds to one TTI.

A base station and a user equipment use a paging indicator (PI) as a specific value indicating a transmission of a paging message. The base station defines a specific identity (e.g., paging-radio network temporary identity: P-RNTI) for a usage of the PI and is then able to inform the user equipment of the paging information transmission. For instance, a user equipment wakes up each DRX cycle and then receives one subframe to recognize a presence or non-presence of a paging message. If P-RNTI is contained in L1/L2 control channel (PDCCH) of the received subframe, the user equipment is able to recognize that the paging message exists in PDSCH of the corresponding subframe. If a UE identity (e.g., IMSI) of the user equipment is contained in the paging message, the user equipment makes a response (e.g., RRC connection, system information reception, etc.) to the base station and is then able to receive a service.

In the following description, system information is explained. First of all, the system information should contain necessary information a user equipment should be aware of to access a base station. Therefore, the user equipment should receive all system information before accessing the base station and should have latest system information all the time. Since all user equipments in a cell should be aware of the system information, the base station periodically transmits the system information.

System information can be divided into MIB (Master Information Block), SB (Scheduling Block) and SIB (System Information Block). The MIB enables a user equipment to recognize such a physical configuration of a corresponding cell as a bandwidth and the like. The SB indicates such transmission information of SIBs as a transmission cycle and the like. In this case, the SIB is an aggregate of system informations related to each other. For instance, a specific SIB contains information of a neighbor cell only and another SIB just contains information of a UL radio channel used by a user equipment.

In the following description, MBMS (multimedia broadcast multicast service) is explained. First of all, MBMS (multimedia broadcast multicast service) is a kind of a broadcast/multicast service and is the service for transmitting multimedia data packets to a plurality of user equipments simultaneously. 'Broadcast/multicast service' or /MBMS' used in the present disclosure can be substituted with such a terminology as 'point-to-multipoint service', 'MBS (multicast and broadcast service)' and the like. In the MBMS based on IP multicast, user equipments share a resource required for data packet transmission with each other and then receive the same multimedia data. Hence, in case that user equipments on a predetermined level using MBMS exist in the same cell, it is able to raise resource efficiency. Since the MBMS has no relation with an RRC connected state, a user equipment in an idle state is able to receive the corresponding service.

Figure 7:
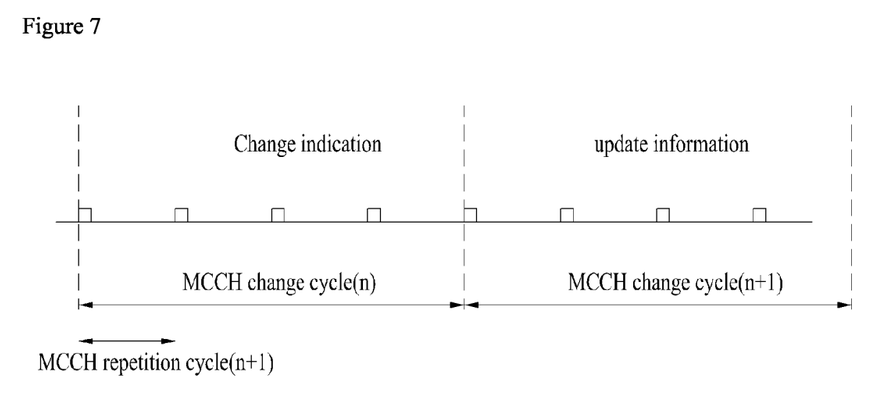
FIG. 7 is a diagram for a transmission scheme of MCCH (MBMS control channel).

A logical channel MCCH (MBMS control channel) or MTCH (MBMS traffic channel) for MBMS can be mapped to a transport channel MCH (MBMS channel) The MCCH carries an RRC message containing MBMS related common control information, while the MTCH carries a traffic of a specific MBMS service. A single MCCH exists in a single MBSFN (MBMS single frequency network) area to carry the same MBMS information or traffic. In case that a plurality of MBSFN areas are provided by a single cell, a user equipment may be able to receive a plurality of MCCHs. FIG. 7 shows a transmission scheme of MCCH information.

Referring to FIG. 7, if an MBMS related RRC message is changed in a specific MCCH, PDCCH transmits M-RNTI (MBMS-radio network temporary identity) and an MCCH indicator indicating a specific MCCH. A user equipment, which supports MBMS, receives the M-RNTI and the MCCH indicator via the PDCCH, recognizes that the MBMS related RRC message has been changed, and is then able to receive the specific MCCH. The RRC message of the MCCH can be changed each change cycle and is repeatedly broadcasted each repetitive cycle. FIG. 7 shows a transmission scheme of MCCH information.

Meanwhile, the MCCH transmits MESFNAreaConfiguration message that indicates a ongoing MBMS session and a corresponding RB setting. And, the MCCH is able to transmit an MBMS counting request (MBMSCountingRequest) message for counting the number of user equipments in an RRC connected state, each of which receives or intends to receive at least one MBMS service.

A specific MBMS control information can be provided via BCCH. In particular, the specific MBMS control information can be contained in SystemInformationBlockType13 broadcasted via the BCCH.

As mentioned in the foregoing description, a network is able to count the number of user equipments, each of which receives or intends to receive a specific service, through a counting procedure. In a counting procedure according to a related art, if a network sends an MBMS counting request message, a user equipment sends back an MBMS counting response message.

In the counting procedure according to the related art, the user equipment is able to make the response in a manner that an MBMS index, which indicates at least one service already received by the corresponding user equipment or at least one service the corresponding user equipment attempts to receive, is contained in the counting response message. In this case, the MBMS service index indicates a sequence or index of a corresponding service in an MBMS service list contained in the MCCH information or the counting request message.

According to the related art, if a counting procedure is simultaneously performed in different MBSFN areas during a change cycle of one MCCH using different MCCHs, it causes a problem that it is unable to know a counting response message transmitted by a user equipment relates to a prescribed one of the MBSFN areas.

Therefore, according to the present invention, in order that a network capable of transmitting a counting request message per MBSFN area for a plurality of MBSFN areas can clearly understand an MBMS counting response message of a user equipment, the user equipment having accessed the network receives an MBMS counting request message for one MBSFN area and enables an MBSFN area indicator indicating one MBSFN area to be contained in the MBMS counting response message. For this, the network transmits a system information block containing identities of a plurality of the MBSFN areas. In this case, the MBSFN area indicator contained in the MEMS counting response message indicates one of a plurality of the areas contained in the system information block.

Figure 8:
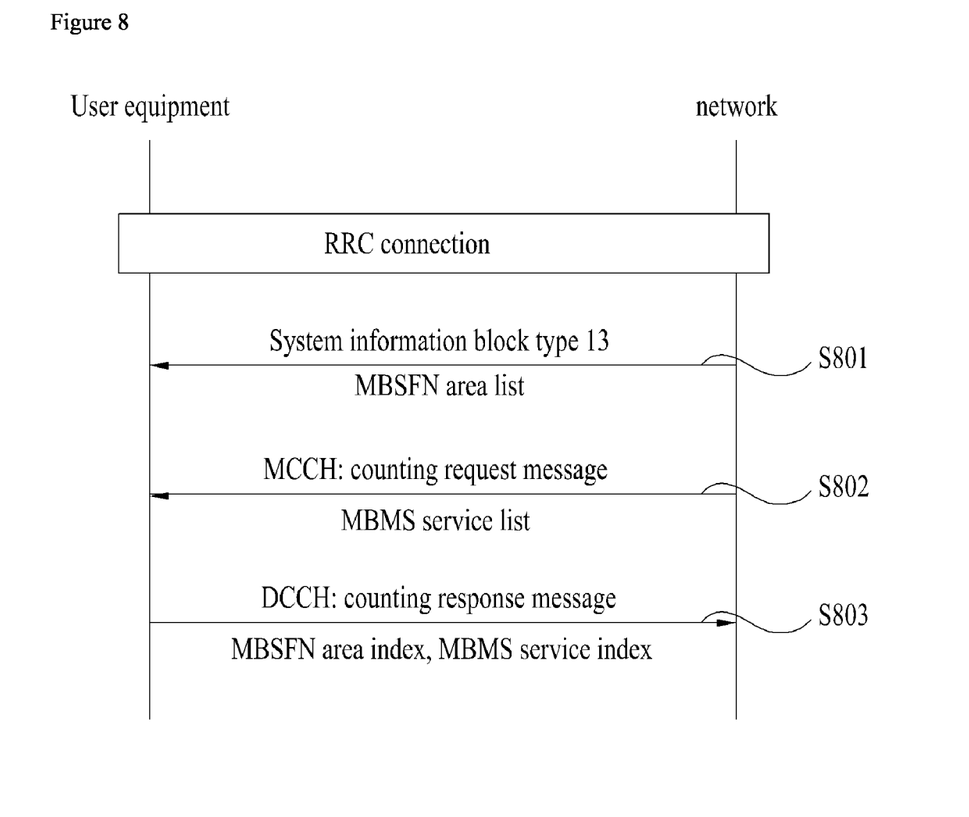
FIG. 8 is a signal flowchart for explaining an MBMS (multimedia broadcast multicast service) counting response scheme according to an embodiment of the present invention.

FIG. 8 is a signal flowchart for explaining an MBMS (multimedia broadcast multicast service) counting response scheme according to an embodiment of the present invention. In particular, in FIG. 8, a user equipment transmits an MBMS counting response message to a network only if it is in an RRC connected state.

Referring to FIG. 8, a user equipment receives a system information block via BCCH in a step S801. In this case, the received system information block is a system information block type 13 that carries control information on MBMS. The system information block type 13 contains a list of MBSFN areas provided by a corresponding cell. For instance, the system information block type 13 is able to contain a list that indicates an index of an MBSFN area to which a corresponding cell belongs, as shown in Table 1.

TABLE 1

System information block type 13 = {MBSFN#12, MBSFN#15, MBSFN#52}

Subsequently, the network repeatedly transmits an MBMS counting request message during one change cycle via MVVH for a specific MBSFN area in the step S802. In this case, the MBMS counting request message contains a list indicating indexes of MBMSs, each of which makes a request for an MBMS counting response.

Meanwhile, if an MBMS, which is being received or is going to be received by the user equipment, exists in the MBMS counting request message, the user equipment configures an MBSFN area index and counting response list, i.e., an MBMS counting response message containing an MBMS index list.

In this case, the MBSFN area index contained in the MBMS counting response message indicates an MBSFN area of the MBMS, which is being received or is going to be received by the user equipment, or an MBSFN area corresponding to the MCCH carrying the MBMS counting request message. Preferably, the MBSFN area index is able to indicate one of the MBSFN areas included in the system information block type 13 received in the step S801. In this case, the MBSFN area index can be represented as a sequence of the corresponding MBSFN area in the MBSFN area list.

In particular, since the list indicating the MBSFN area index included in the system information block type 13 is able to indicate total 8 MBSFN area indexes, the MBSFN area index contained in the MBMS counting response message is preferably configured with a 3-bit side field.

Moreover, the counting response list contained in the MBMS counting response message, i.e., the MBMS index list indicates the MBMS, which is being received or is going to be received by the user equipment. In this case, it can be represented as a sequence of the corresponding MBMS in the MGMS list contained in the MBMS counting request message received in the step S802.

In this case, if a plurality of MBMS indexes for one MBSFN area are included, the user equipment enables an index of a corresponding MBSFN area to be contained in the MBMS counting response message once only. Moreover, a channel of MBMS, which is being received or is going to be received by the user equipment, i.e., an index indicating PMCH can be contained in the MBMS counting response message. In this case, if a plurality of MBMS indexes are contained in one PMCH, the user equipment enables an index of a corresponding PMCH to be contained in the MBMS counting response message once only.

Finally, the user equipment transmits the above-generated MBMS counting response message to the network in the step S803.

Figure 9:
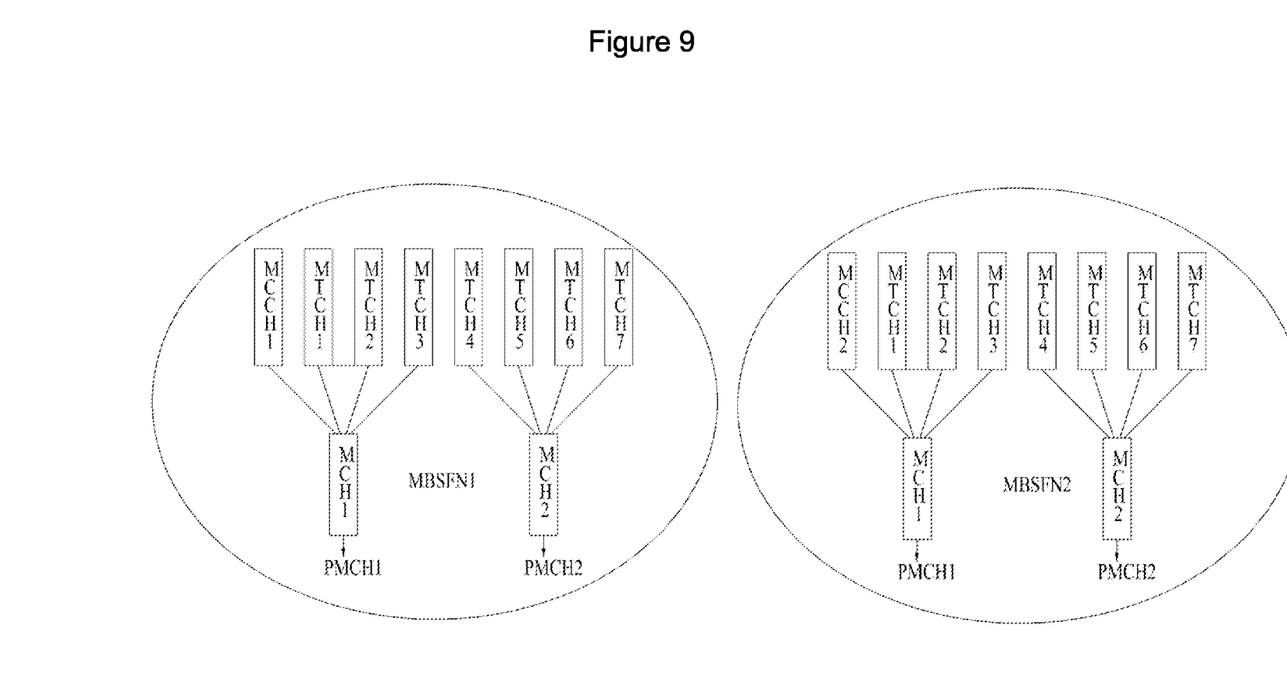
FIG. 9 is a diagram for explaining an example of configuring an MBMS counting response message according to an embodiment of the present invention.

FIG. 9 is a diagram for explaining an example of configuring an MBMS counting response message according to an embodiment of the present invention.

Particularly, in FIG. 9, assume that an MBSFN area index refers to SIB type 13 and also assume that MBMS refers to a PMCH (physical MBMS channel) information list and an MBMS session information list carried on MCCH. In particular, in order to check PMCH carrying MBMS, which is received or is going to be received, the PMCH information list is used. And, an MBMS session related to the MBMS, which is received or is going to be received, is checked using the MBMS session information list.

Referring to FIG. 9, if a user equipment receives a specific MBMS via MTCH 5 in MBSFN area 1 or receives another MBMS via MTCH 7, the user equipment enables such information as shown in Table 2 to be contained in an MBMS counting response message.

TABLE 2

- MBSFN: 1
- PMCH: 2
- MTCH: 2, 4

In Table 2, {MTCH: 2, 4} indicates an MBMS session received via PMCH 2 in MBSFN area 1. In particular, the '2' is a sequence of a corresponding MBMS in an MBMS list contained in MCCH and indicates an MBMS corresponding to MTCH 5. And, the '7' indicates an MBMS corresponding to MTCH 7.

Meanwhile, in case that the user equipment receives all MBMSs in MBSFN area 2, the user equipment enables information shown in Table 3 to be contained in the MBMS counting response message.

TABLE 3

- MBSFN: 2
- PMCH: 1
- MTCH: 1,2,3
- PMCH: 2
- MTCH: 1,2,3,4

Table 3 indicates that MBMSs respectively corresponding to MTCH 1, MTCH 2 and MTCH 3 are received or shall be received via PMCH 1 in MGSFN area 2. Moreover, Table 3 indicates that MBMSs respectively corresponding to the received MTCH sequences, i.e., MBMSs respectively corresponding to MTCH 4, MTCH 5, MTCH 6 and MTCH 7 are received or shall be received via PMCH 2 in the MBSFN area 2.

According to the present invention, a network, which is able to send an MBMS counting request message per area for a plurality of MBSFN regions, is able to clearly recognize a presence or non-presence of MBMS reception by a user equipment or a presence of non-presence of a reception intention of the user equipment via an MBMS counting response message sent back by the corresponding user equipment.

Figure 10:
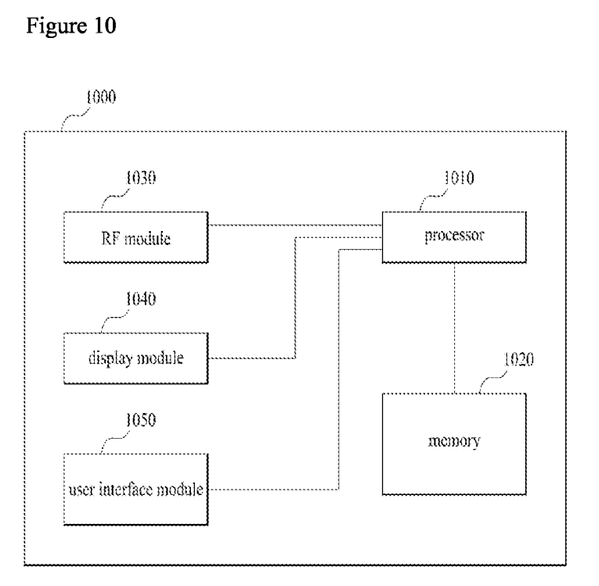
FIG. 10 is an exemplary block diagram of a communication apparatus according to one embodiment of the present invention.

FIG. 10 is an exemplary block diagram of a communication apparatus according to one embodiment of the present invention.

Referring to FIG. 10, a communication device 1000 includes a processor 1010, a memory 1020, an RF module 1030, a display module 1040 and a user interface module 1050.

The communication device 1000 is illustrated for clarity and convenience of the description and some modules can be omitted. Moreover, the communication device 1000 is able to further include at least one necessary module. And, some modules of the communication device 100 can be further divided into sub-modules. The processor 1010 is configured to perform operations according to the embodiment of the present invention exemplarily described with reference to the accompanying drawings. In particular, the detailed operations of the processor 1010 can refer to the contents described with reference to FIGS. 1 to 9.

The memory 1020 is connected to the processor 1010 and stores an operating system, applications, program codes, data and the like. The RF module 1030 is connected to the processor 1010 and performs a function of converting a baseband signal to a radio signal or converting a radio signal to a baseband signal. For this, the RF module 1030 performs analog conversion, amplification, filtering and frequency uplink transform or inverse processes thereof. The display module 1040 is connected to the processor 1010 and displays various kinds of informations. The display module 1040 can include such a well-known element as LCD (Liquid Crystal Display), LED (Light Emitting Diode), OLED (Organic Light Emitting Diode) and the like, by which the present invention is non-limited. The user interface module 1050 is connected to the processor 1010 and can include a combination of well-known interfaces including a keypad, a touchscreen and the like.

The above described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In the present disclosure, embodiments of the present invention are described centering on the data transmission/reception relations between a relay node and a base station. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

[Industrial Applicability]

As mentioned in the foregoing description, although a method for a user equipment to transmit a counting response message indicating a service area in a wireless communication system and apparatus therefore is described mainly with reference to examples applied to 3GPP LTE system, the present invention is applicable to various kinds of wireless communication systems as well as the 3GPP LTE system.

The invention claimed is:

1. A method of transmitting a Long Term Evolution (LTE) Multimedia Broadcast Multicast Service (MBMS) message by a user equipment (UE) in a wireless communication system, the method comprising:
   receiving, by the UE, a system information block 13 (SIB13) including information on a Multimedia Broadcast multicast service Single Frequency Network (MBSFN) area list, through a broadcast control channel (BCCH) from a network;
   receiving, by the UE, a first LTE MBMS message comprising information on one or more services through a multicast control channel (MCCH) from the network; and
   transmitting, by the UE, a second LTE MBMS message indicating a specific area corresponding to an area of the MBSFN area list and a specific service to the network in response to the first message, the UE wishing to receive the specific service of the one or more services or being interested to receive the specific service of the one or more services.

2. The method of claim 1, further comprising:
   receiving the specific service in the specific area from the network.

3. The method of claim 1, further comprising:
   checking the specific area related to the specific service based on the information on the MBSFN area list.

4. The method of claim 3, wherein the specific area corresponds to the area of the MBSFN area list and is an area in which the first LTE MBMS message is received.

5. The method of claim 1, wherein the specific area includes at least one cell for providing the specific service.

6. The method of claim 1,
   wherein the first LTE MBMS message comprises an MBMS (multimedia broadcast multicast service) counting request message, and wherein the second LTE MBMS message comprises an MBMS counting response message.

7. The method of claim 1, wherein the UE is in an RRC (radio resource control) connected state (RRC_CONNECTED).

8. A user equipment (UE) in a wireless communication system, comprising:
- a wireless communication module of the UE configured to transceive signals with a network; and
- a processor of the UE controlling the wireless communication module, the processor of the UE configured to process the signals,
- wherein the wireless communication module of the UE receives a system information block 13 (SIB 13) including information on a Multimedia Broadcast multicast service Single Frequency Network (MBSFN) area list through a broadcast control channel (BCCH) from the network and receives a first Long Term Evolution (LTE) Multimedia Broadcast Multicast Service (MBMS) message comprising information on one or more services through a multicast control channel (MCCH) from the network and
- wherein the processor of the UE generates a second LTE MBMS message indicating a specific area corresponding to an area of the MBSFN area list and a specific service to transmit the second LTE MBMS message to the network in response to the first message, the UE wishing to receive the specific service of the one or more services or being interested to receive the specific service of the one or more services.

* * * * *